MEMORY CIRCUIT EMPLOYING NEGATIVE RESISTANCE ELEMENTS

Filed Sept. 12, 1960 5 Sheets-Sheet 1

INVENTOR.
MELVIN M. KAUFMAN
BY John V. Regan
ATTORNEY

Nov. 30, 1965 M. M. KAUFMAN 3,221,180

MEMORY CIRCUIT EMPLOYING NEGATIVE RESISTANCE ELEMENTS

Filed Sept. 12, 1960 5 Sheets-Sheet 2

INVENTOR.
MELVIN M. KAUFMAN
BY John V. Regan
ATTORNEY

MEMORY CIRCUIT EMPLOYING NEGATIVE RESISTANCE ELEMENTS

Filed Sept. 12, 1960 5 Sheets-Sheet 3

INVENTOR.
MELVIN M. KAUFMAN
BY John V. Regan
ATTORNEY

INVENTOR.
MELVIN M. KAUFMAN
BY John V. Regan
ATTORNEY

MEMORY CIRCUIT EMPLOYING NEGATIVE RESISTANCE ELEMENTS

Filed Sept. 12, 1960 5 Sheets-Sheet 5

INVENTOR.
MELVIN M. KAUFMAN
BY John V. Regan
ATTORNEY

United States Patent Office 3,221,180

Patented Nov. 30, 1965

3,221,180

MEMORY CIRCUITS EMPLOYING NEGATIVE RESISTANCE ELEMENTS

Melvin M. Kaufman, Merchantville, N.J., assignor to Radio Corporation of America, a corporation of Delaware Filed Sept. 12, 1960, Ser. No. 55,324
16 Claims. (Cl. 307—88.5)

The present invention relates to a memory which is especially suitable for use in high speed data processing systems.

The circuit of the invention includes a voltage controlled negative resistance element, such as a tunnel diode, connected in series with a tunnel rectifier. Preferably, the peak-to-valley voltage of the tunnel diode is smaller than the voltage extent of the substantially constant current operating region of the tunnel rectifier. The circuit is biased at a level such that the diode can operate in either its high or its low voltage state and, in either state, the rectifier operates in its substantially constant current region.

A binary digit may be written into the circuit by switching the diode to one or the other of its stable states. Coincident pulses may be employed. The digit stored in the circuit may be read out by driving the tunnel rectifier from its constant current operating region into its varying current operating region. A voltage pulse may be employed which is applied both to the diode and rectifier.

A feature of the invention is that the stored digit may be read out destructively or non-destructively, as desired.

The invention is described in greater detail below and is illustrated in the following drawings of which:

Figure 1:
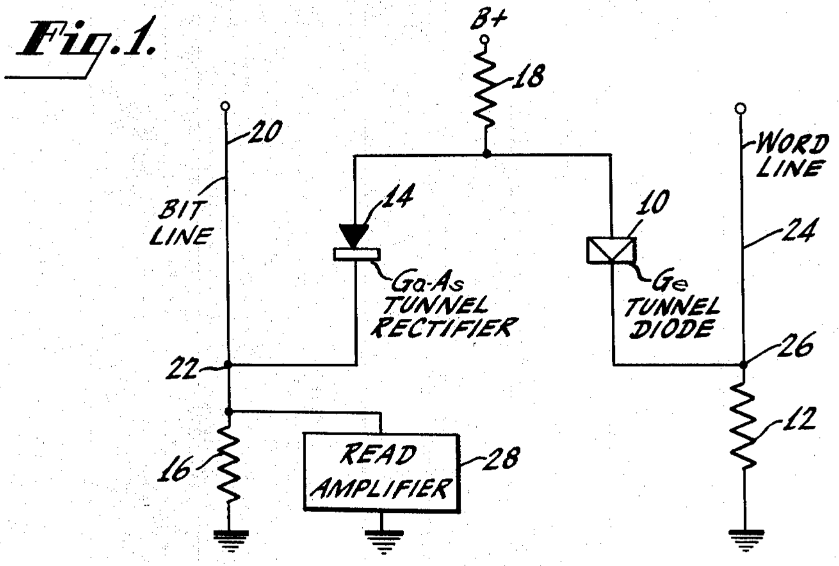
FIG. 1 is a block and schematic circuit diagram of a memory unit according to the invention.
Figure 5A:
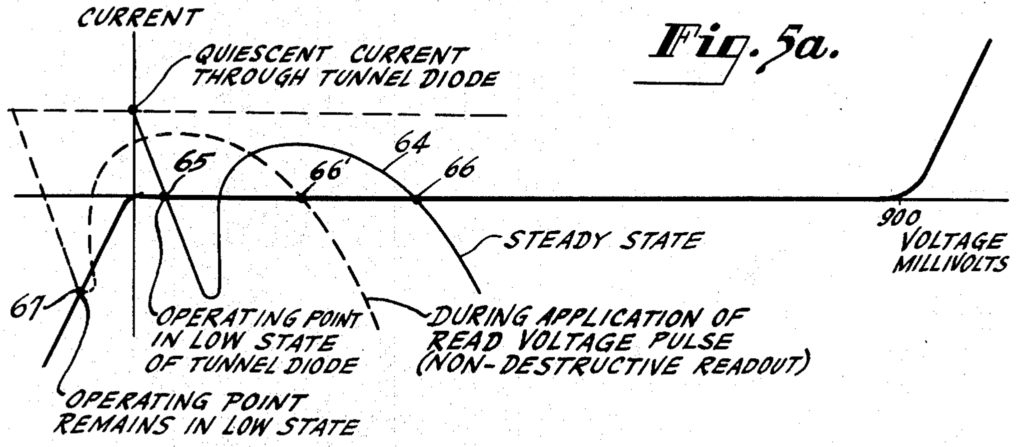
Figure 5B:
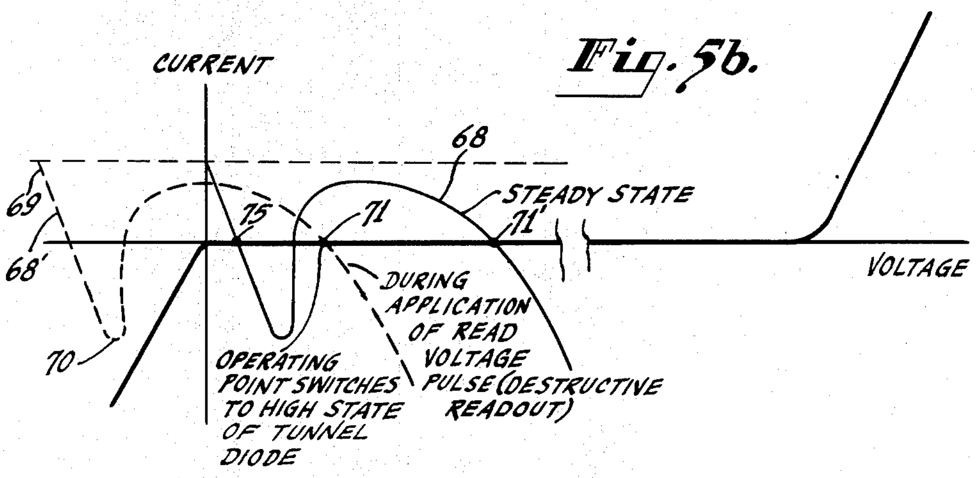
Figure 5C:
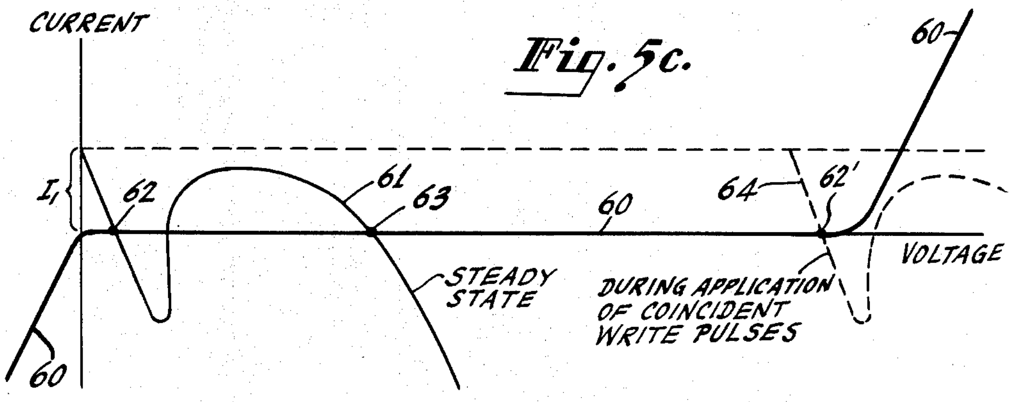
Figure 6:
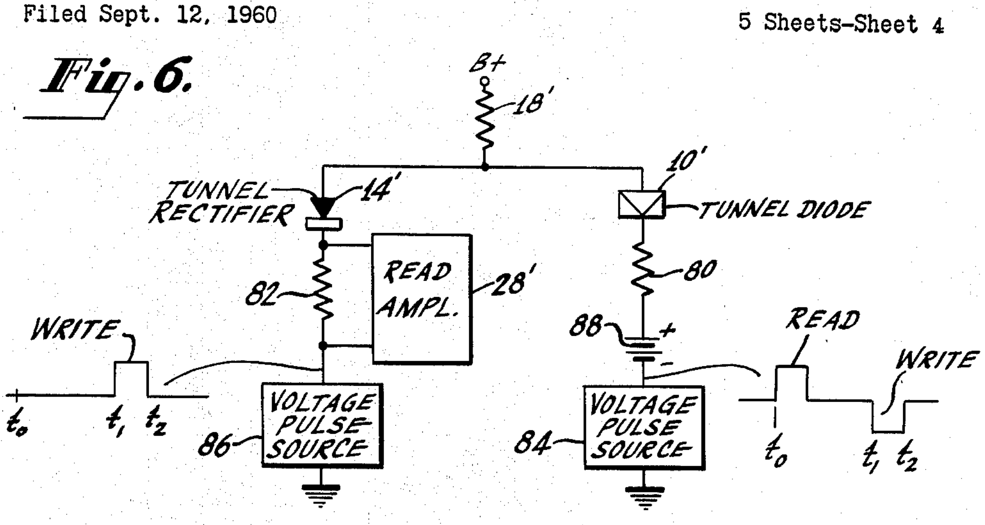
Figure 7:
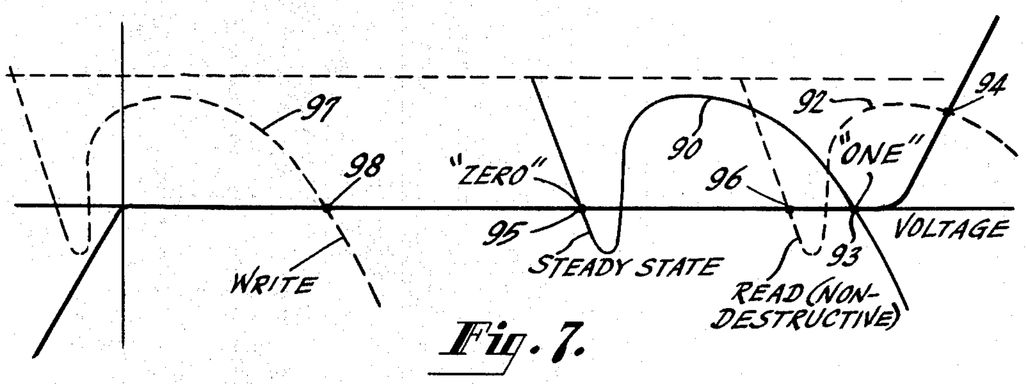
Figure 8:
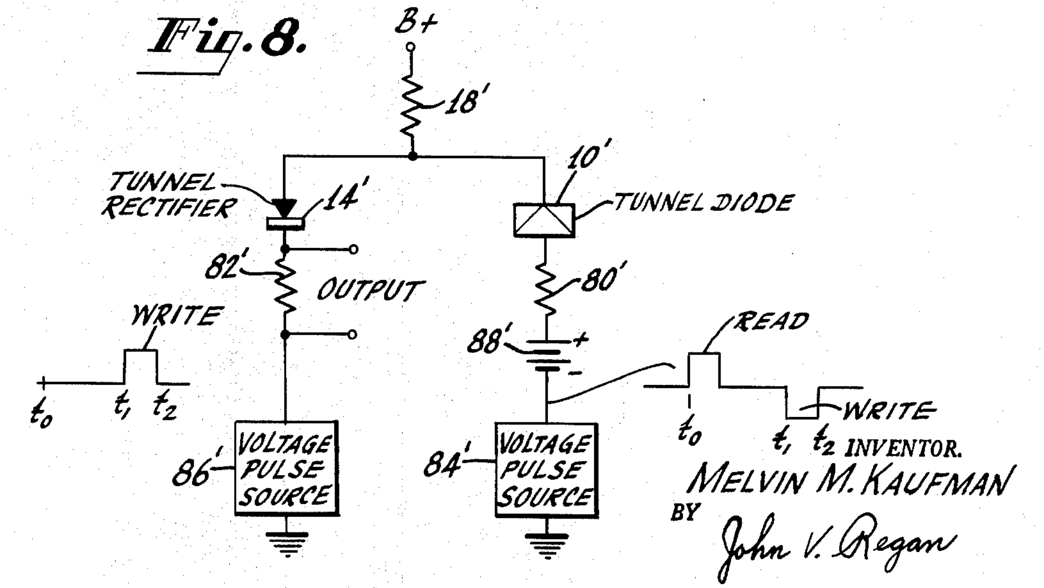
Figure 9:
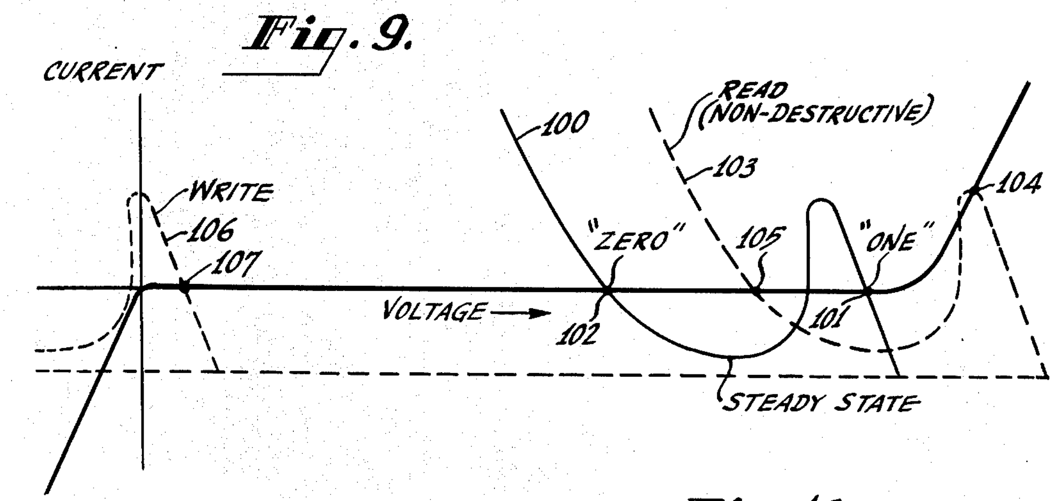
Figure 10:
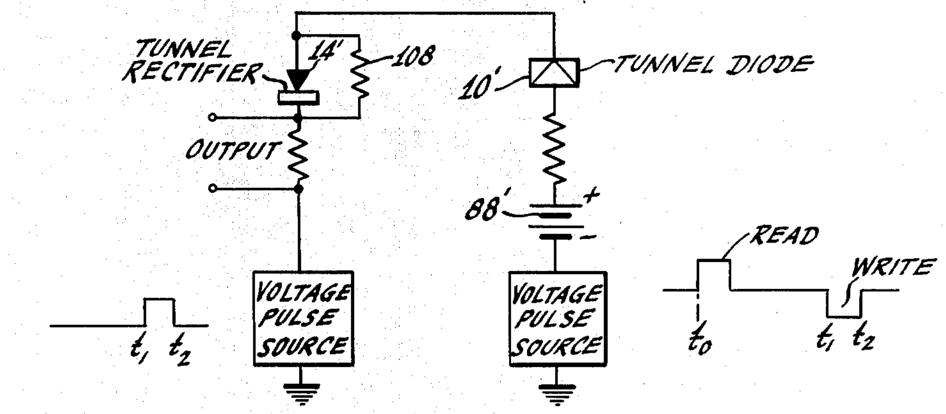
Figure 11:
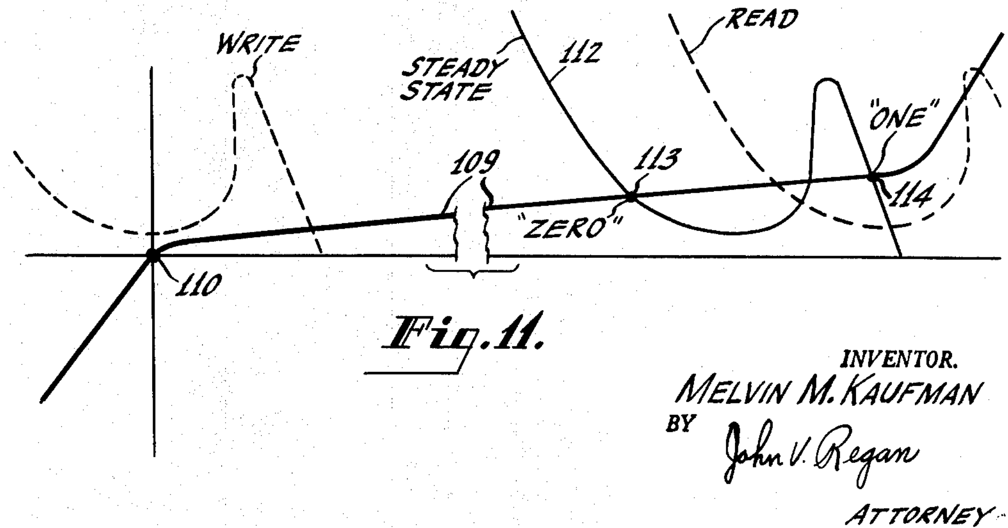

FIGS. 5*a–c* are characteristic curves to explain the operation of the circuit of FIG. 1;

FIG. 6 is a block and schematic circuit diagram of another embodiment of the present invention;

FIG. 7 is a graph to explain the operation of the circuit of FIG. 6;

FIG. 8 is a block and schematic circuit diagram of another form of the present inventon;

FIG. 9 is a graph to explain the operation of the circuit of FIG. 8;

FIG. 10 is a block and schematic circuit diagram of another form of the present invention; and FIG. 11 is a graph to explain the operation of the circuit of FIG. 10.

The memory unit of FIG. 1 comprises two parallel circuits, one including a germanium tunnel diode 10 in series with a resistor 12 and the other including a gallium arsenide tunnel rectifier 14 in series with a resistor 16. As is understood in the art, a tunnel diode is a voltage controlled negative resistance element having stable high and low voltage operating regions and a negative resistance operating region between the stable regions. The tunnel diode can be switched from one stable state to another at very high speeds and its operation is believed to depend upon the quantum mechanical tunneling of electrons through a highly doped junction.

A tunner rectifier may be made in a manner similar to that by which a tunnel diode is made and can be thought of as a tunnel diode with a very low current peak. Tunnel rectifiers are described in an article by Lesk et al. appearing in the 1959 IRE Wescon Convention Record, Part III, page 9. In the article, the tunnel rectifier is referred to as a "backward diode," however, since the operation of the device, like that of the tunnel diode, is believed to depend upon quantum mechanical tunneling, the backward diode has since more commonly become known among some as a "tunnel rectifier." Throughout the present application the latter term is used to describe this device.

Returning to FIG. 1, a source of voltage indicated by B+ is connected through a common load resistor 18 to the two parallel circuits. The value of resistor 18 is relatively high compared to the resistance of the parallel circuits and accordingly the source of voltage and resistor together may be thought of as a constant current source. A bit line 20 is connected to the terminal 22 between resistor 16 and the tunnel rectifier. A word line 24 is connected to the terminal 26 between resistor 12 and the tunnel diode. Read amplifier 28, which is connected across the resistor 16, senses the voltage across this resistor and thereby indirectly senses the current flowing through the resistor.

Figure 2:
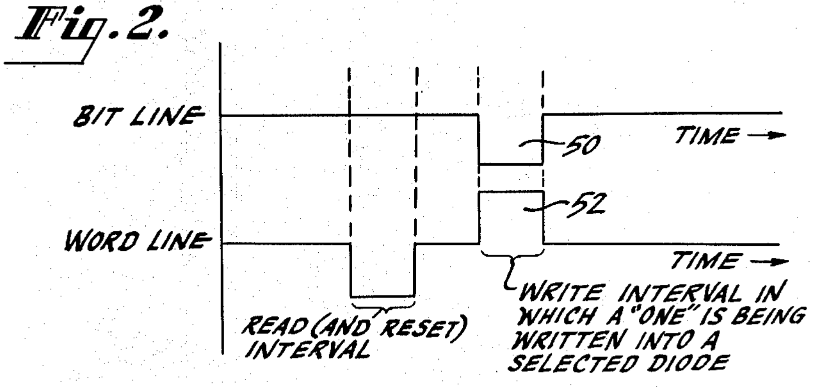
FIG. 2 is a drawing of waveforms present at various points in the circuit during the read and write intervals.
Figure 3:
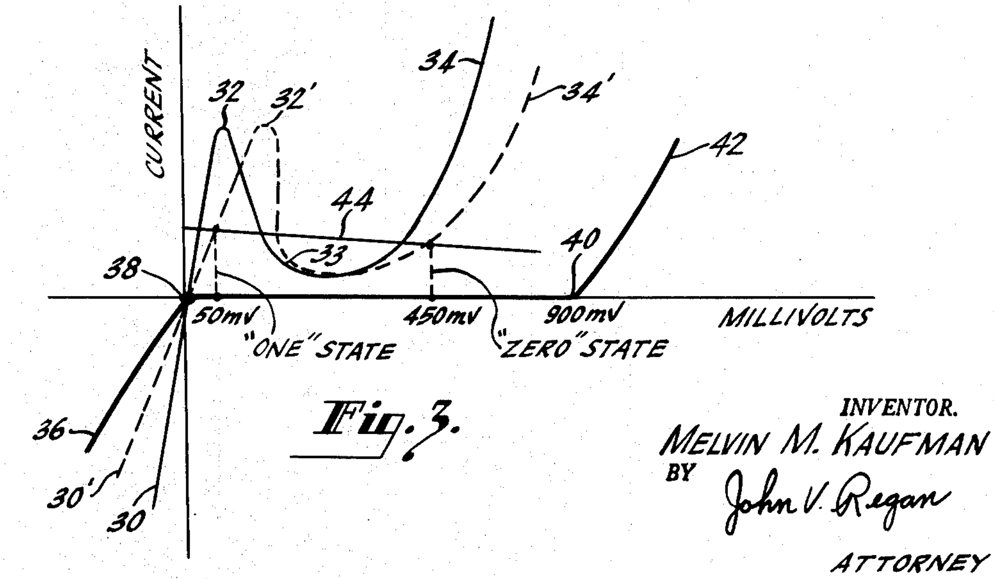
FIG. 3 shows characteristic curves of current versus voltage for various of the circuit elements of FIG. 1.
Figure 4:
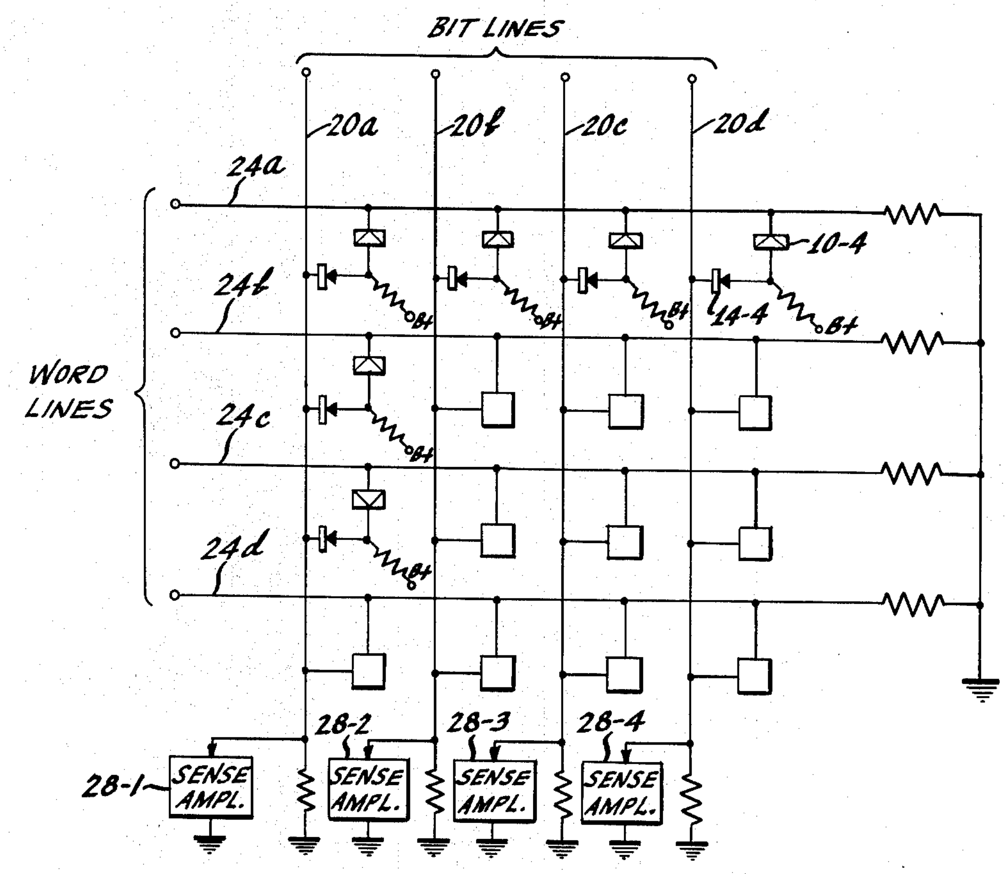
FIG. 4 is a schematic showing of a portion of a word organized memory according to the present invention.

The operation of the circuit of FIG. 1 may be better understood by referring to FIGS. 2 and 3. The characteristic of current versus voltage for a germanium tunnel diode such as 10 is shown at 30, 32, 33, 34 of FIG. 3. When a resistor is placed in series with the tunnel diode, the combined characteristic for the two elements is as shown by the dashed curve 30′, 32′, 33′, 34′. The amount of "tilt" in the characteristic depends, of course, on the value of resistance. The characteristic of current versus voltage for the series combination of a gallium arsenide tunnel rectifier such as 14 and a resistor may be as shown at 36, 38, 40, 42. In the region 38, 40 the current drawn by the rectifier remains substantially constant (at close to zero milliamperes) and accordingly, this region is sometimes referred to hereinafter as a constant current region.

A germanium tunnel diode exhibits a current peak at about 50 millivolts and a current valley at about 350 or so millivolts. A gallium arsenide tunnel rectifier has its first break point at about zero volts and its high voltage break point at about 900 millivolts.

As already mentioned, resistor 18 is of relatively large value. The load line for this resistor is as shown at 44. The quiescent current which flows is such that when the tunnel diode 10 is in its low voltage state, the voltage across the tunnel diode and resistor 12 is of the order of 40 or so millivolts, and when the tunnel diode is in its high voltage state, the voltage across the tunnel diode and resistor 12 is of the order of 450 millivolts or so. For the purposes of the present discussion, the low voltage state of the tunnel diode is arbitrarily considered to correspond to the storage of the binary digit "one" and the high voltage state of the tunnel diode to correspond to the storage of binary digit "zero". It may be observed from FIG. 3 that at both the "zero" and "one" states, practically no current flows through the gallium arsenide tunnel rectifier so that practically "zero" volts appears across the resistor 16.

In order to write a binary digit into the circuit of FIG. 1, coincident voltage pulses are applied to the word and bit lines. If, for example, a negative pulse such as shown at 50 in FIG. 2 is applied to the bit line and concurrently a positive pulse such as shown at 52 is applied to the word line, the binary digit "one" is written into the circuit. The positive and negative pulses are both in the reverse direction with respect to the tunnel diode and both in the forward direction with respect to the tunnel rectifier due to the back-to-back connection of these units. The positive and negative pulses are of both the same amplitude and their combined amplitude is such that the tunnel diode is made to switch to its low voltage state.

The write operation is illustrated in FIG. 5*c*. In this figure, the tunnel diode and its series resistance is considered as a load on the tunnel rectifier and its series resistance. The characteristic of current versus voltage for the tunnel rectifier and its series resistance is shown at 60 and the characteristic for the tunnel diode and its series resistance acting as a load is shown at 61. The quiescent current passing into the tunnel diode is indicated graphically by the symbol $I_1$ along the current axis. The tunnel diode may be operating in its low voltage state 62 or its high voltage state 63.

For the purposes of the present explanation, it may be assumed that it is desired to write the binary digit "one" into the circuit of FIG. 1. In other words, it is desired to place the tunnel diode in its low voltage operating state 62. Voltage pulses are applied to the bit and word lines as shown at 50 and 52 (FIG. 2). These are both in the forward direction with respect to the gallium arsenide tunnel rectifier. The effect is to move the load line 61 (FIG. 5*c*) along the voltage axis and in the forward direction (to the right in the figure) with respect to the gallium arsenide tunnel rectifier. The coincident pulses are of an amplitude such that they move the load line 61 to position 64. At this position, there is no stable intersection between the high state operating region of the tunnel diode and the characteristic of current versus voltage for the tunnel rectifier. The only operating point possible is 62′ and this occurs in the low voltage or "one" state of the tunnel diode. Summarizing, the application of coincident voltage pulses on the word and bit lines, which are in the forward direction for the gallium arsenide tunnel rectifier, cause the binary digit "one" to be written into the gallium arsenide tunnel rectifier.

In order to read or interrogate the circuit of FIG. 1, a negative voltage pulse is applied to the word line. This pulse is in the reverse direction with respect to the tunnel rectifier and the effect is to shift the operation of the tunnel rectifier from its "one" state to an operating point in the reverse current operating region of the tunnel rectifier. This reverse current corresponds to current flow through resistor 16 and the voltage drop produced by the current may be sensed by read amplifier 28. This voltage indicates that a binary digit "one" was stored in the circuit.

The read cycle is illustrated graphically in FIGS. 5*a* and *b*. Again, the tunnel diode and its series resistance is considered as a load on the tunnel rectifier and its series resistance. Quiescently, the tunnel diode characteristic is as shown at 64 (FIG. 5*a*) and the two stable operating points which are possible are 65 and 66. 65 corresponds to storage of the binary digit "one" and 66 corresponds to storage of the binary digit "zero." It may be assumed initially that the diode is storing the binary digit "one," that is, the operating point is in the low voltage state of the diode at 65. In order to read the memory unit a negative pulse is applied to the word line 24. This pulse is in the forward direction for the tunnel diode and in the reverse direction for the tunnel rectifier. The effect of the pulse is to shift the diode characteristic to the left along the voltage axis. If, as assumed, the operating point is initially 65, as the tunnel diode characteristic shifts to the left, the current passing through the tunnel rectifier increases from substantially "zero" current to a relatively large value of current. If non-destructive read-out is desired, the read pulse amplitude is made to be such that the tunnel diode does not switch to its high state. For example, during the read voltage pulse the circuit operating point may change to 67. The tunnel diode is still in its low state and high current passes through the tunnel rectifier. This high current may be sensed by sensing the voltage across resistor 16. After the read pulse is removed, the circuit returns to operating point 65, that is, it continues to store a "one."

When operating the memory unit of FIG. 1 in its non-destructive mode, it may be desirable to reset the circuit to its "zero" state after the read cycle. This may be done by applying a relatively large negative pulse to the word line after the read cycle and before the write cycle. The effect of the pulse is similar to that which occurs during destructive read-out, as is explained below.

If it is desired to destructively read out the information stored in the memory unit, a voltage pulse of larger amplitude than the one employed for non-destructive read-out must be used. The circuit is assumed initially to be in the "one" state 75 (FIG. 5*b*). The effect of the application of the larger amplitude pulse is as indicated in FIG. 5*b*. The load line shifts further to the left in the direction of the voltage axis. The steady state load line is shown at 68 and the shifted load line is shown at 68′. During the transition from 68 to 68′, the current through the rectifier increases and then decereases to substantially zero. This current pulse may be sensed by amplifier 28 (FIG. 1). Note that there is no stable intersection between the low voltage state 69, 70 of the shifted characteristic 68′ and the tunnel rectifier characteristic. Accordingly, the tunnel diode must switch to its high voltage state, if it is not already there, and the operating point must switch to 71. This corresponds to storage of the binary digit "zero." When the read pulse is removed, the load line returns to its original position and the operating point is at 71′.

Returning for a moment to FIG. 5*a*, assume now that the operating point is quiescently at 66. This corresponds to storage of the binary digit "zero." When a read current pulse is applied to the word line, the load line shifts to the left just as previously explained. However, there remains a stable intersection 66′ between the high voltage state of the tunnel diode and the substantially zero current operating region of the tunnel rectifier. Accordingly, if the diode is initially storing the binary digit "zero," it produces no current flow through the series resistor 16 during the read interval and the read amplifier 28 therefore senses a binary "zero."

A modified form of the circuit of FIG. 1 is shown in FIG. 6. Similar reference numerals primed are applied to similar elements. The resistors 12 and 16 are not explicitly included in the circuit of FIG. 6. Instead, the total resistance effectively in series with the tunnel diode is shown at 80 and the total resistance effectively in series with the tunnel rectifier 14′ is shown at 82. These resistances include the contributions made by the line terminating resistors 12 and 16 (FIG. 1). The word and bit lines are not shown in FIG. 6. Instead, blocks legended "Voltage Pulse Source" 84 and 86 are shown effectively in series with the resistances 80 and 82. So far, the circuit is substantially identical with the circuit of FIG. 1 but is merely shown slightly differently. The important differences between the circuit of FIG. 6 and the one of FIG. 1 are, however, the addition of the voltage source shown as a battery 88 which is effectively in series with the tunnel diode and tunnel rectifier, and the changed polarity of the read and write pulses.

The operation of the circuit of FIG. 6 may be better understood by refering to FIG. 7. The battery 88 provides a voltage in the reverse direction with respect to the tunnel diode and in the forward direction with respect to the tunnel rectifier. The effect is to shift the load line formed by the tunnel diode and series resistance to the right so that the steady state or quiescent condition of the circuit is as shown at 90. The "zero" state of the tunnel diode (operating point 45) now corresponds to its low voltage state. This operating point occurs close to the center of the substantially constant current operating region of the tunnel rectifier. The "one" state of the tunnel diode (operating point 93) corresponds to its high voltage state and this occurs close to the high voltage break point of the tunnel rectifier.

In order to read out from the memory unit, a positive pulse is applied by source 84. This pulse is in the reverse direction with respect to the tunnel diode and in the forward direction with respect to the tunnel rectifier. The effect is to shift the load line 90 to the right as indicated by the dashed curve 92. If the memory unit was initially storing the binary digit "one," the current through the diode changes from a relatively high value (operating point 93) to a relatively low value (operating point 94) and the current passing into the tunnel rectifier and through resistor 82 sharply increases. Accordingly, a voltage pulse appears across resistor 82 and the read amplifier 28' senses a binary digit "one." If, on the other hand, the tunnel diode is initially storing the binary digit "zero" (operating point 95), the voltage across the tunnel rectifier increases during the read cycle but the current through it remains the same at substantially "zero." This is indicated at operating point 96. Thus, no voltage pulse appears across resistance 82 and the read amplifier reads the binary digit "zero."

As in the case of the circuit of FIG. 1, the readout may be destructive or non-destructive. FIG. 7 illustrates non-destructive read-out. If the read pulse amplitude is increased, tunnel diode 10' switches to its low voltage state since there is no longer a stable intersection between the high state operating region of the diode and the characteristic of current versus voltage for the tunnel rectifier. Thus, if the diode was previously storing the binary digit "one," after read-out the diode stores the binary digit "zero." As in the embodiment of FIG. 1, an advantage of this mode of operation is that no reset pulse is required. That is, the diode is always storing a binary "zero" of a destructive read operation. If destructive read-out is employed, it may be advantageous to apply a positive reset pulse from source 84 to the tunnel diode after the read interval.

In order to write the binary digit "one" into the circuit, a positive pulse is applied by source 86 and a negative pulse is applied by source 84. These pulses are both in the reverse direction with respect to tunnel rectifier 14'. The effect of the pulse is to shift the load line to the left as is indicated by dashed curve 97. The two pulses move the load line sufficiently to the left so that there is no longer an intersection between the low state of the tunnel diode and the characteristic of the tunnel rectifier. Accordingly, the tunnel diode switches to its "one" state 98.

Another embodiment of the invention is shown in FIG. 8. The difference between this embodiment and the one of FIG. 6 is that the polarity of the tunnel diode 10' is reversed. Accordingly, the battery 88' supplies a forward voltage both to the tunnel diode and to the tunnel rectifier.

The operation of the circuit of FIG. 8 is illustrated in FIG. 9. Again, the tunnel diode and its series resistance is considered as a load on the tunnel rectifier and its series resistance. Quiescently, the load line is as shown at 100. Note that in view of the changed polarity of the tunnel diode, its characteristic is rotated through 180° with respect to the characteristic 90 shown in FIG. 7.

The circuit operation is similar to that of the other circuits already described. The "one" state of the circuit corresponds to the low state of the tunnel diode and is shown at 101. The "zero" state of the circuit corresponds to the high state of the tunnel diode and is shown at 102. To interrogate the circuit of FIG. 8, a positive pulse is applied by voltage source 84'. This is in the forward direction with respect both to the tunnel diode and to the tunnel rectifier so that the load line moves to the right as is shown by dashed curve 103. If the operating point is initially at 101 and non-destructive read-out is desired, the operating point moves to 104 during the read cycle. This corresponds to high current through the tunnel rectifier. If the diode is initially at operating point 102, the operating point moves to 105 during the read cycle and no additional current flows through the tunnel rectifier. If destructive read-out is desired, the read pulse amplitude is increased as in the previous circuits.

In order to write the binary digit "one" into the circuit a positive pulse is applied by source 86' and a negative pulse is applied by source 84'. These are both in the reverse direction with respect to the tunnel diode and tunnel rectifier. The effect is to shift the load line to the left as indicated by dashed curve 106 in a manner already indicated for previous circuits. The operating point must go to 107 in the low state of the tunnel diode. This corresponds to storage of the binary digit "one."

The embodiment of the invention shown in FIG. 10 is different than the one of FIG. 8 in two respects. First, the current source which supplies a quiescent operating current is not required. Second, a resistor 108 is shunted across the tunnel rectifier.

The circuit operation is illustrated in FIG. 11. The effect of the shunting resistor on the tunnel rectifier 14' is as indicated at 109. The current through the circuit consisting of the tunnel rectifier 14' and its shunt resistor 108 between the low voltage break point 110 and the high voltage break point slightly beyond operating point 114 is still relatively constant but it is at a value somewhat greater than "zero." This current is the quiescent current which flows from battery 88'. The load line for the tunnel rectifier and its associated resistors is considered to be the tunnel diode. The load line is illustrated at 112. Note that there are two stable intersections, one at 113 and the other at 114. Intersection 113 corresponds to storage of the binary digit "zero" and intersection 114 corresponds to the storage of the binary digit "one." The operation during the read and write cycles is quite analogous to that of the circuit of FIG. 8 and need not be discussed in detail.

The memory circuit of FIGS. 1–4 is suitable for use in a word organized memory. A portion of such a memory, using the circuit FIG. 1 for purposes of illustration, is shown in part in FIG. 4. The bit lines are shown at 20*a*, 20*b*, 20*c* and 20*d* and the word lines are shown at 24*a*, 24*b*, 24*c* and 24*d*. At each intersection of the lines, there are a tunnel diode and tunnel rectifier. These are shown schematically at some intersections and in block diagram form at other intersections. The reading and writing circuits and the word and bit line switching circuits are conventional and are not shown in FIG. 4.

In operation, in order to write a binary digit into a memory circuit, coincident write pulses are applied to a selected bit line and a selected word line. For example, if it is desired to write the binary digit "one" into the circuit comprising gallium arsenide tunnel rectifier 14–14 and germanium tunnel diode 10–4, a positive pulse is applied to word line 24*a* and a negative pulse is applied to bit line 20*d*. Information is read out of the memory a word at a time. For example, if it is desired to read out a word consisting of all of the bits stored in the memory units connected to line 24*a*, a negative-going read voltage pulse is applied to line 24*a*. The sense amplifiers 28–1, 28–2, 28–3, 28–4 then read out the information stored in parallel.

The memory circuits discussed can also be operated in bit organized rather than word organized fashion. In a bit organized memory, information is read into the memory by applying coincident pluses and information is read out from any one storage location of the memory by applying coincident pulses to the word and bit lines which intersect at that location.

The circuit of FIG. 6 is an example of one which can operate in a bit organized mode. When so operated, the bias supplied by battery 88 is so adjusted that the "zero" state 95 (FIG. 7) of the circuit is the same distance from the "zero" voltage break point of the tunnel rectifier characteristic as the "one" storage state 93 is from the high voltage break point of the tunnel rectifier characteristic. Since the voltage difference between the "zero" and "one" states may be of the order of 400 millivolts or so, this means that each would be about 250 millivolts from the break point closest to it. A binary "one" can be written into a circuit of this type by applying voltage pulses in the forward direction from sources 84 and 86 to the tunnel rectifier. The two pulses together should have an amplitude of about 350 millivolts. The binary digit "zero" may be written into the circuit by applying reverse bias voltage pulses from sources 84 and 86 to the tunnel rectifier. Again, the combined amplitude of the two pulses should be about 350 millivolts. The circuit can be read out by applying, for example, forward bias pulses from sources 84 and 86 to the tunnel rectifier.

A practical circuit according to FIG. 1 may have the following circuit parameters. These values are illustrative only and are not to be taken as limiting.

Lines 20 and 24: 50 ohm strip lines.
Resistors 12 and 16: 50 ohms each.
Tunnel rectifier 14: gallium arsenide having break points at zero and 900 millivolts.
Tunnel diode 10; germanium with peak current of 5 milliamperes and valley and peak voltages at 50 and 350 millivolts, respectively.
Resistor 18: 500 ohms.

What is claimed is:

1. A memory comprising, in combination, a pair of circuits, one including a tunnel diode and the other including a tunnel rectifier which is connected to the tunnel diode; means coupled to the connection between the tunnel diode and tunnel rectifier for applying a quiescent operating current in parallel to the two circuits at a level such that the tunnel diode can assume either of two stable voltage states and, in either of these states the tunnel rectifier operates in its substantially constant current region; and means for applying concident write pulses to the tunnel diode and for placing the tunnel diode in a desired one of its two stable states a read pulse to across both the tunnel diode and tunnel rectifier for causing the tunnel rectifier to draw current when the tunnel diode is in a given one of its stable states but not when it is in its other stable state.

2. A memory comprising, in combination, a pair of circuits, one including a tunnel diode and the other including a tunnel rectifier which is connected to the tunnel diode; means coupled to the connection between the tunnel diode and tunnel rectifier for applying a quiescent operating current in parallel to the two circuits at a level such that the tunnel diode can assmume either of two stable voltage states and, in either of these states, the tunnel rectifier operates in its substantially constant current operating region; and means for applying coincident write pulses to the tunnel diode, and for applying a read pulse in the forward direction to the tunnel diode and in the reverse direction to the tunnel rectifier.

3. A memory comprising, in combination, a pair of circuits, one including a tunnel diode and the other including a tunnel rectifier which is connected to the tunnel diode and, with respect to that connection, is poled in the same direction as the tunnel diode; means coupled to the connection between the tunnel diode and tunnel rectifier for applying a quiescent forward operating current in parallel to the two circuits in the forward direction with respect to both the tunnel diode and tunnel rectifier at a level such that the tunnel diode can assume either of two stable voltage states and, in either of these states, the tunnel rectifier draws substantially no current; and means for applying concident write pulses to the tunnel diode, and for applying a read pulse in the forward direction to the tunnel diode and in the reverse direction to the tunnel rectifier.

4. A memory comprising, in combination, a pair of circuits, one including a voltage controlled negative resistance element and the other including a tunnel rectifier which is connected to the negative resistance element and is biased at or close to the center of the substantially constant current region of its operating range when the negative resistance element is in one stable voltage state and near a limit of said region when the element is in its other stable voltage state; means coupled to the connection between said element and said rectifier for applying a quiescent operating current in parallel to the two circuits at a level such that said element can assume either of said two stable voltage states; and means for applying coincident write pulses to the element, and a read pulse to both the element and tunnel rectifier of an amplitude sufficient to drive the tunnel rectifier into a region of its operating range in which it draws substantial current when said element is in said other stable state.

5. In a memory, a tunnel diode directly connected at one electrode to the corresponding electrode of a tunnel rectifier; means coupled to said one electrode of said tunnel diode for applying forward operating current to both said tunnel diode and tunnel rectifier at a level such that the diode can assume either one of two stable voltage states and in either such state the recifier draws substantially no current; means for writing information into the diode comprising means for placing the diode into one or othe other of its stable states; and means for interrogating said diode comprising means for applying a pulse to the rectifier of an amplitude and polarity to cause the latter to draw substantial current when the diode is in one state but not when the diode is in the other state.

6. In a memory, a germanium tunnel diode directly connected at one electrode to the corresponding electrode of a gallium arsenide tunnel rectifier; means coupled to said direct connection for applying forward operating current to both the tunnel diode and tunnel rectifier at a level such that the diode can assume either one of two stable voltage states and in either state the rectifier draws substantially no bias current; means for writing information into the diode comprising means for placing the diode into one or the other of its stable states; and means for interrogating said diode comprising means for applying a pulse to the rectifier of an amplitude and polarity to cause the latter to draw substantial current when the diode is in one state but not when the diode is in the other state.

7. In a memory, a tunnel rectifier having two varying current operating regions and a substantially constant current operating region between the two varying current operating regions; a tunnel diode connected to the tunnel rectifier; means for quiescently biasing the rectifier and diode at a level such that the diode is capable of assuming a stable operating point in its high or its low voltage state and, at either operating point, the tunnel rectifier is in its constant current operating region; means for writing a binary digit into the memory comprising means for placing the tunnel diode at one of its stable operating points; and means for interrogating the memory comprising means driving said tunnel rectifier from its constant current operating region into its varying current operating region when said diode is at one of its stable operating points.

8. In a memory, a tunnel rectifier having two varying current operating regions and a substantially constant current operating region between the two varying current operating regions; a tunnel diode having a substantially smaller voltage extent between the zero voltage point of its characteristic and the current valley point of its characteristic than the voltage extent of the substantially constant current operating region of the tunnel rectifier, connected to the tunnel rectifier; means for quiescently biasing the rectifier and diode at a level such that the diode is capable of assuming stable operating points in its high and low voltage operating regions and, at either operating point, the tunnel rectifier is in its constant current operating region; means for writing a binary digit into the memory comprising means for placing the tunnel diode at one of its stable operating points; and means for interrogating the memory comprising means driving said tunnel rectifier from its constant current operating region into its varying current operating region when said diode is at one of its stable operating points.

9. In a memory as set forth in claim 8, said tunnel rectifier comprising a gallium arsenide tunnel rectifier and said tunnel diode comprising a germanium tunnel diode.

10. A memory circuit comprising, in combination:
a tunnel diode;
a tunnel rectifier connected at one electrode to one electrode of the tunnel diode;
means coupled to the tunnel diode and tunnel rectifier for applying a quiescent operating current thereto at a level such that the tunnel diode can assume either one of two stable voltage states and in either state, the tunnel rectifier operates in its substantially constant current region;
means coupled to the other electrode of the tunnel diode and tunnel rectifier respectively for applying a voltage in one sense across the tunnel diode and tunnel rectifier for placing the tunnel diode in a desired one of its two stable states; and
means coupled to said other electrode of said tunnel diode and tunnel rectifier respectively for applying a voltage in the opposite sense across both the tunnel diode and tunnel rectifier for driving the tunnel rectifier into its varying current region when the tunnel diode is in one of its two stable states, and for maintaining the tunnel rectifier within its constant current region when the tunnel diode is in the other of its two stable states.

11. A memory circuit comprising, in combination:
a first circuit including a tunnel diode;
a second circuit including a tunnel rectifier which is connected at one electrode to an electrode of the tunnel diode;
means coupled to the two circuits above for applying a quiescent operating current to said two circuits at a level such that the tunnel diode can assume either of two stable voltage states and, in either state, the tunnel rectifier operates in its substantially constant current region;
means coupled to the two circuits for applying coincident voltages in series across the tunnel diode and tunnel rectifier for placing the tunnel diode in a desired one of its two stable states; and
means coupled to the two circuits for applying a voltage in series across both the tunnel diode and tunnel rectifier for driving the tunnel rectifier into its varying current region when the tunnel diode is in one of its two stable states, and for maintaining the tunnel rectifier within its constant current region when the tunnel diode is in the other of its two stable states.

12. A memory circuit comprising, in combination:
a first circuit including a tunnel diode;
a second circuit including a tunnel rectifier which is connected at one electrode to an electrode of the tunnel diode;
means coupled to the two circuits above for applying a quiescent operating current in parallel to said two circuits at a level such that the tunnel diode can assume either of two stable voltage states and, in either of these states, the tunnel rectifier operates in its substantially constant current region;
means coupled to the two circuits for applying coincident voltages in series across the tunnel diode and tunnel rectifier for placing the tunnel diode in a desired one of its two stable states; and
means coupled to the two circuits for applying a voltage in series across both the tunnel diode and tunnel rectifier for driving the tunnel rectifier into its varying current region when the tunnel diode is in one of its two stable states, and for maintaining the tunnel rectifier within its constant current region when the tunnel diode is in the other of its two stable states.

13. A memory comprising, in combination, a pair of circuits, one including a germanium tunnel diode and the other including a gallium arsenide tunnel rectifier which is connected to the tunnel diode, like-electrode to like-electrode; means for applying a quiescent operating current to the connection between the tunnel diode and the tunnel rectifier, which current is in the forward direction with respect both to the tunnel diode and tunnel rectifier and is at a level such that the tunnel diode can assume either of two stable voltage states and, in either of these states, the tunnel rectifier draws substantially no current; and means for applying coincident write pulses across the tunnel rectifier and the tunnel diode for placing the tunnel diode in a desired one of its stable voltage states, and for applying a read pulse across the tunnel diode and tunnel rectifier which is in the forward direction with respect to the tunnel diode and in the reverse direction with respect to the tunnel rectifier.

14. In combination, a tunnel rectifier element having two varying current operating regions and a substantially constant current operating region between the two; a tunnel diode element having a region between the zero voltage point and the current valley point of its characteristic of substantially smaller voltage extent than the constant current operating region of the tunnel rectifier element, connected at one electrode to an electrode of the tunnel rectifier element; means coupled to the two elements for biasing them at a level such that the tunnel diode has two stable operating points, one in its high voltage state and the other in its low voltage state and, at either operating point, the tunnel rectifier is in its constant current operating region; means coupled to the tunnel diode element for switching it from one of said stable perating points to the other; and means connected to the other electrodes of the two elements for applying a voltage across the two elements for driving the tunnel rectifier element into its varying current operating region and thereby causing the tunnel rectifier element to draw current when the tunnel diode element is at one of its stable operating points but not when the tunnel diode element is at its other stable operating point.

15. The combination set forth in claim 14, in which said two elements are connected anode to cathode.

16. In combination, a tunnel rectifier having two varying current operating regions and a substantially constant current operating region between the two; a tunnel diode having a region between the zero voltage point and the current valley point of its characterisic of substantially smaller voltage extent than the constant current operating region of the tunnel rectifier, connected like-electrode to like-electrode with the tunnel recifier; means coupled to the tunnel rectifier and tunnel diode for biasing these elements at a level such that the tunnel diode has two stable operating points, one in its high voltage state and the other in its low voltage state and, at either operating point, the tunnel rectifier is in its constant current operating region; and means connected to the other electrode of the tunnel diode and tunnel rectifier, respectively, for applying a voltage in one sense across these two elements for placing the tunnel diode at one of its stable operating points, and for applying a voltage in the opposite sense across these two elements for ascertaining the stable operating point of the tunnel diode.

References Cited by the Examiner

UNITED STATES PATENTS

| | | | |
|---|---|---|---|
| 2,877,359 | 3/1959 | Ross | 307—88.5 |
| 2,890,439 | 6/1959 | Bird et al. | 340—173 |
| 2,907,000 | 9/1959 | Lawrence | 340—173 |
| 2,966,599 | 12/1960 | Haas | 307—88.5 |
| 3,119,985 | 1/1964 | Kaufman | 307—88.5 |

OTHER REFERENCES

International Solid State Circuits Conference, Digest of Technical Papers, Feb. 10, 1960, "The Tunnel Diode as a Logic Element," by Lewin, et al. pages 10–11, FIG. 2 relied on.

ARTHUR GAUSS, *Primary Examiner.*

IRVING SRAGOW, NEIL C. READ, JOHN W. HUCKERT, *Examiners.*